United States Patent
Ellington

(10) Patent No.: US 9,403,547 B2
(45) Date of Patent: Aug. 2, 2016

(54) PALLET TRANSPORTATION ASSEMBLY AND PROCESSES OF TRANSPORTING PALLETS USING THE SAME

(71) Applicant: Coca-Cola Bottling Co. United, Inc., Birmingham, AL (US)

(72) Inventor: Stanley Charles Ellington, Trussville, AL (US)

(73) Assignee: Coca-Cola Bottling Co. United, Inc., Birmingham, AL (US)

( * ) Notice: Subject to any disclaimer, the term of this patent is extended or adjusted under 35 U.S.C. 154(b) by 0 days.

(21) Appl. No.: 14/475,981

(22) Filed: Sep. 3, 2014

(65) Prior Publication Data

US 2015/0056056 A1 Feb. 26, 2015

Related U.S. Application Data

(63) Continuation-in-part of application No. 13/404,797, filed on Feb. 24, 2012, now Pat. No. 9,260,125.

(51) Int. Cl.
*B66C 3/00* (2006.01)
*B62B 3/06* (2006.01)

(52) U.S. Cl.
CPC ............... *B62B 3/06* (2013.01); *B62B 2203/24* (2013.01); *B62B 2203/29* (2013.01); *B62B 2203/60* (2013.01)

(58) Field of Classification Search
CPC .... B62B 3/0643; B62B 3/008; B62B 3/0606; B62B 3/0612; B62B 3/0618; B62B 2203/24; B62B 2203/29; B62B 3/022; B62B 2203/10; B62B 2203/13; B62B 2205/30; B66F 9/065; B66F 9/12; B66F 9/125; B66F 9/16; B66F 9/18; B60P 1/025; B60P 1/027

USPC .......................................................... 187/237
See application file for complete search history.

(56) References Cited

U.S. PATENT DOCUMENTS

| | | | |
|---|---|---|---|
| 1,129,775 A * | 2/1915 | Anthony | 254/10 C |
| 2,610,751 A | 9/1952 | Bevan | |
| 2,818,989 A | 1/1958 | Burke | |
| 2,827,189 A | 3/1958 | Knudstrup | |
| 3,039,635 A | 6/1962 | Drackett et al. | |
| 3,097,009 A | 7/1963 | Martin | |
| 3,451,656 A * | 6/1969 | Goodacre | 254/8 R |
| 3,625,385 A | 12/1971 | Ide | |
| 3,734,329 A | 5/1973 | Grelck | |
| 3,791,544 A | 2/1974 | Moses | |
| 4,102,464 A | 7/1978 | Schuster | |
| 4,497,606 A | 2/1985 | Hobson | |
| 5,456,565 A | 10/1995 | Pigott et al. | |
| 5,556,118 A * | 9/1996 | Kern et al. | 280/47.16 |
| 5,681,139 A * | 10/1997 | Szanto | B62B 3/0637 254/4 C |
| 5,752,584 A * | 5/1998 | Magoto et al. | 187/234 |
| 5,897,286 A | 4/1999 | Whittaker | |
| 6,042,329 A | 3/2000 | Marquez et al. | |
| 6,186,728 B1 * | 2/2001 | Michaud | 414/458 |
| 6,206,628 B1 | 3/2001 | McDermott | |

(Continued)

*Primary Examiner* — Saul Rodriguez
*Assistant Examiner* — Mark Hageman
(74) *Attorney, Agent, or Firm* — Katten Muchin Rosenman LLP

(57) ABSTRACT

The present invention relates to a pallet transportation assembly comprising a first and second tine, each having a top, a bottom, a front wheel, a middle wheel, a rear wheel, and a riser; and a body coupled to the first and second tines comprising a tine adjustment system and a vertical backing portion.

13 Claims, 5 Drawing Sheets

(56) References Cited

U.S. PATENT DOCUMENTS

| | | | |
|---|---|---|---|
| 2007/0210542 A1* | 9/2007 | Hammond | 280/43.12 |
| 2009/0014219 A1* | 1/2009 | Springston et al. | 180/19.1 |
| 2009/0314582 A1 | 12/2009 | Meijer | |
| 2010/0295261 A1 | 11/2010 | Ellington | |
| 2012/0211308 A1 | 8/2012 | Issartel | |
| 2015/0048288 A1* | 2/2015 | Magoto et al. | 254/2 C |
| 2015/0298951 A1* | 10/2015 | Apps | B66F 9/12 187/237 |

* cited by examiner

PALLET TRANSPORTATION ASSEMBLY AND PROCESSES OF TRANSPORTING PALLETS USING THE SAME

This application is a continuation-in-part of U.S. patent application Ser. No. 13/404,797, filed Feb. 24, 2012, the contents of both incorporated herein by reference.

BACKGROUND OF THE INVENTION

1. Field of the Invention

The present invention relates to a pallet transportation assembly comprising a first and second tine, each having a top, a bottom, a front wheel, a middle wheel, a rear wheel, and a riser; and a body coupled to the first and second tines comprising a tine adjustment system and a vertical backing portion.

2. Background Art

Manually operated pallet jacks include mechanical devices used primarily for interior applications in such locations as warehouses and some larger consumer stores. The term "manually" refers to the means for moving and operating the pallets jacks: typically, they use hydraulic, pneumatic or electric lifting mechanisms that an operator enables to lift goods. Pallet jacks typically have two or more tines, that are placed under a pallet, upon which is stored the goods to be moved. In the U.S., loaded pallets are typically about 4 feet long by 4 feet wide, and can be between a couple of inches to as much as 8-10 feet in height. The major considerations in the maximum height are the weight to be lifted and the center of gravity.

Other types of pallet jacks include those that are completely or semi-automated. These pallet jacks can include an internal combustion engine or motor, or an electric or propane operated motor that drives the pallet jack according to mechanical inputs received from the operator. Some of these pallet jacks can place goods on pallet several stories in height (20'-40').

As briefly discussed above, pallet jacks are usually operated in the interior of buildings, on substantially smooth, pre-stressed concrete floors. These floors are extremely smooth and extremely strong. Pallet jacks are generally designed to operate in such an interior environment, and usually have two small wheels located in the rear portion of the pallet jack, directly under the lifting mechanism. The tines are located outwardly from the centrally located rear wheels, and the lifting mechanism is located directly over the centrally located rear wheels. Such known pallet jacks are generally useful for lifting heavily loaded pallets, wherein the pallets have a length (measured in the same direction as the tines extend from the pallet jack) to width ratio of about 1.0 and less.

Pallets are used for receiving and handling heavy or bulky loads to facilitate the stacking of several articles to comprise the load. Normally the load and pallet are shipped as a unit. A conventional pallet is a wooden structure made up of several parallel, horizontal stringers and several cross boards, all nailed together to form a rectangular element. In two-way pallets, the tines enter between the stringers and engage the cross boards from below. In a four-way pallet, the stringers are cut out in two areas each to provide inverted U-shaped openings in what is known as the "four-way" side spaced apart to receive the tines. A forklift may enter selectively, from any of the four sides of the pallet, whereas in the two-way pallet entry can occur from only two opposite sides.

All conventional pallets are not exactly alike, but are dimensioned so as to accommodate most fork-lifts. The entry openings are made wide enough to accommodate different tine spacing as well as to enable easy entry without precise maneuvering of the fork-lift. Nevertheless, it is not possible for a pallet jack to unload or load a pallet from the four-way side of a pallet because the inverted U-shaped openings of the pallet are not wide enough to accept the width of a pallet jack tine.

Due to these varying base configurations, certain pallets may require a first pallet transportation assembly, while other pallets require a second transportation assembly.

In a conventional pallet jack, the tines sit atop wheels. The tines may be raised slightly to subsequently raise a pallet off the ground, which transfers the weight of the load from the pallet legs to the pallet jack wheels. In this position, the wheels support the tines and the accompanying load and allow the load to be easily transported. The top surfaces of the tines, however, are at a predetermined distance from the bottoms of the wheels and from the ground. This predetermined distance allows for insertion into a conventional pallet. Other pallet designs, however, may have longer legs and, as such, may sit higher off the ground than conventional pallets. Accordingly, the same predetermined distance may not allow the tines to engage and raise such a pallet while keeping the pallet jack wheels on the ground. As a result, the weight of the load is not transferred from the pallet legs to the pallet jack wheels and the load cannot be effectively transported.

Also, when transporting up an incline, in taller pallet designs, the legs of the pallet extend farther downward than a conventional pallet. As such, the legs come into contact with the incline, which may cause the pallets to dislodge from the pallet transportation assemblies and/or to topple.

Thus, a need exists for a pallet transportation assembly that can transport pallets requiring more vertical clearance from the ground and are capable of transporting pallets having different base configurations.

SUMMARY OF THE INVENTION

In some embodiments, the present invention is a pallet transportation assembly comprising a first and second tine, each having a top, a bottom, a front wheel, a middle wheel, a rear wheel, and a riser; and a body coupled to the first and second tines comprising a tine adjustment system and a vertical backing portion.

In some embodiments, the riser is located within a plane of the tine and is coupled to the tine adjustment system, wherein the tine adjustment system is configured to move the riser in and out of the plane of the tine. In some embodiments, the tine adjustment system is further configured to adjust the elevation, pitch, yaw, length or combinations thereof, of the first or second tine. In some embodiments, the tine adjustment system operates mechanically, pneumatically, electrically, hydraulically or combinations thereof.

In some embodiments the riser is configured to receive a base configuration of a pallet.

In some embodiments, a pallet transportation assembly further comprises a vertical backing portion comprises a lashing system having a strap, buckle and ratcheting mechanism. In some embodiments, the vertical backing portion comprises an adjustable wall.

In some embodiments, the first and second tines are coplanar and parallel to each other.

In some embodiments, the front wheel and rear wheel have a first aspect ratio and the middle wheel has a second aspect ratio, wherein the first aspect ratio is less than the second aspect ratio. In some embodiments, the front and rear wheels are caster swivel wheels. In some embodiments, the middle wheel rotates about a fixed axle.

In some embodiments, the present invention is directed to a pallet transportation assembly comprising a first and second tine, each having a top, a bottom, a front wheel, a middle wheel, a rear wheel and a riser; and a body coupled to the first and second tines comprising a tine adjustment system; a wheel, and a vertical backing portion; wherein the front wheel and rear wheel have a first aspect ratio and the middle wheel has a second aspect ratio greater than the first aspect ratio; wherein the front and rear wheels are caster swivel wheels and the middle wheel rotates about a fixed axle.

In some embodiments, the present invention is directed to a process for transporting a pallet having a base configuration, the process comprising the step of providing a pallet transportation assembly comprising a first and second tine, each having a top, a bottom, a front wheel, a middle wheel, a rear wheel and a riser; and a body coupled to the first and second tines comprising a tine adjustment system; a wheel, and a vertical backing portion; wherein the front wheel and rear wheel have a first aspect ratio and the middle wheel has a second aspect ratio greater than the first aspect ratio; wherein the front and rear wheels are caster swivel wheels and the middle wheel rotates about a fixed axle; adjusting each riser to accommodate the base configuration of the pallet; transporting the pallet; pivoting the pallet transportation assembly about the middle wheel; and adjusting the riser to disengage the assembly from the pallet.

BRIEF DESCRIPTION OF DRAWINGS

The invention is described in detail below with reference to the appended drawings, wherein like numerals designate similar parts.

DETAILED DESCRIPTION OF THE INVENTION

Figure 1:
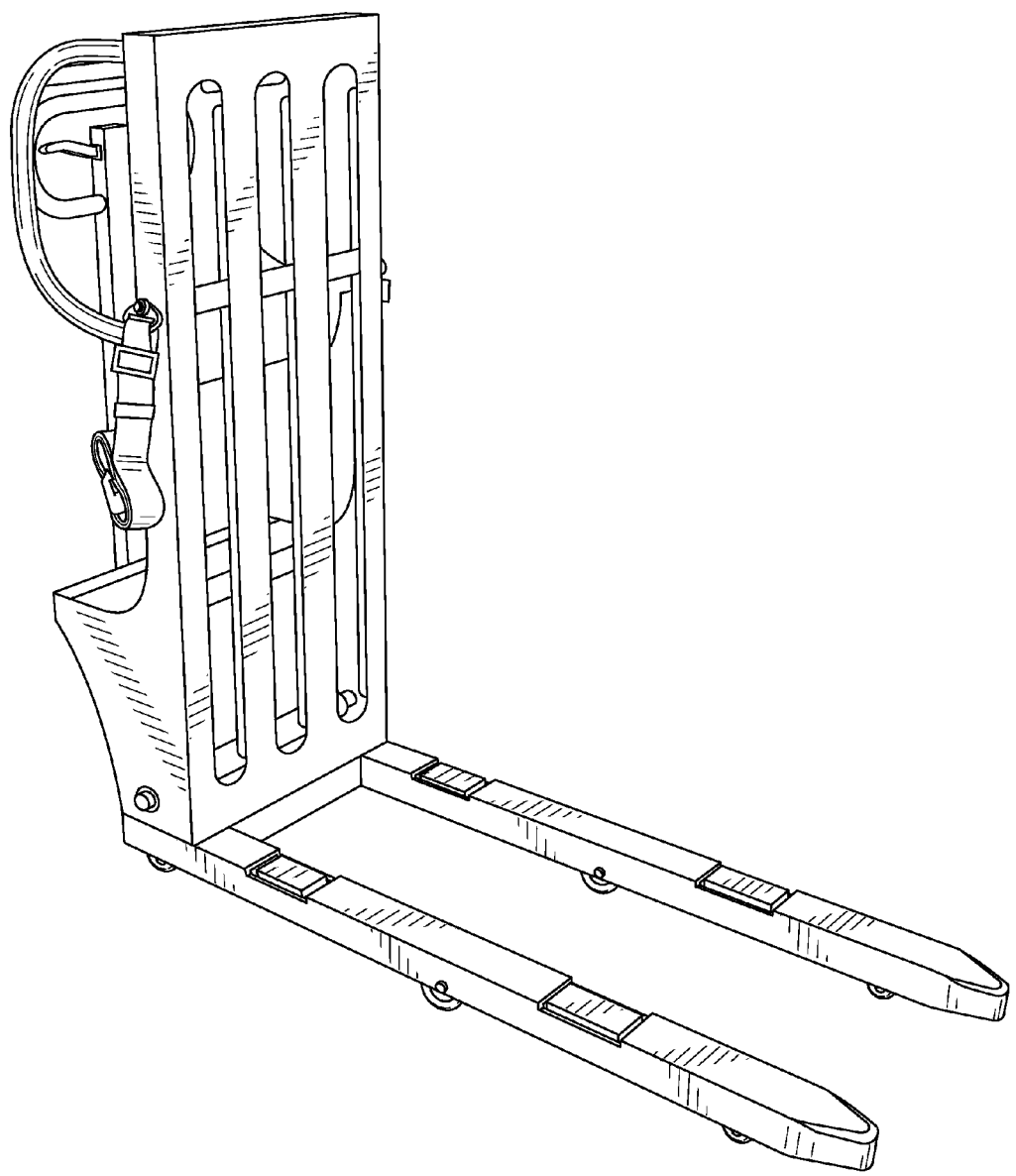
FIG. 1 shows a pallet transportation assembly in accordance with one embodiment of the present invention.
Figure 2:
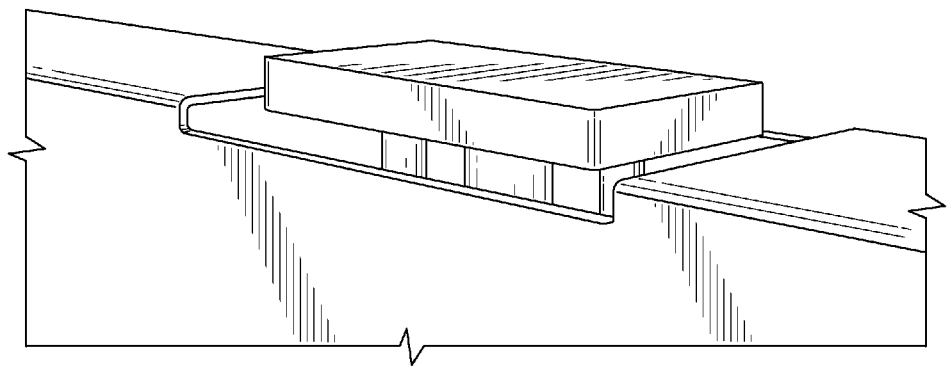
FIG. 2 shows a riser in accordance with one embodiment of the present invention.
Figure 3:
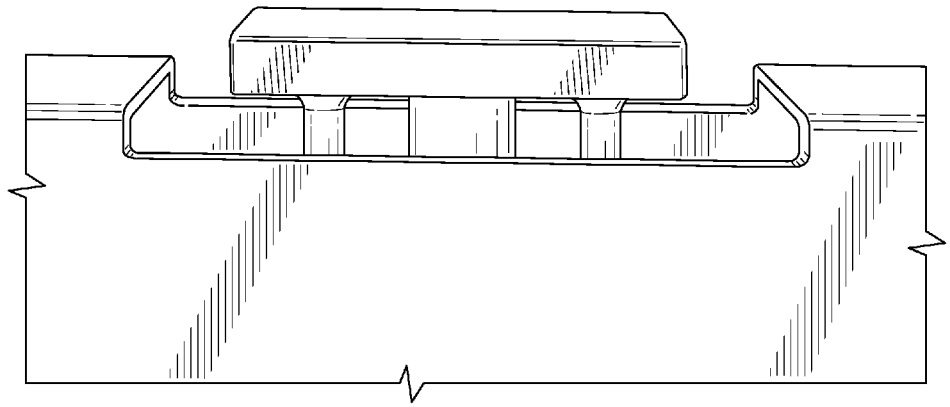
FIG. 3 shows a riser in accordance with one embodiment of the present invention.

The various features of the embodiments will now be described with reference to the drawing figures, in which like parts are identified with the same reference characters. The following description is not to be taken in a limiting sense, but is provided merely for the purpose of describing the general principles of the invention.

According to an embodiment of the present invention, a pallet transportation assembly is disclosed and described herein having a number of significant advantages over conventional pallet transportation assemblies. According the embodiment depicted in FIG. 1, pallet transportation assembly comprises a first tine and a second tine each having a top, a bottom, a front wheel, a middle wheel, a rear wheel, and a riser. A pallet transportation assembly of the present invention further comprises a body having a tine adjustment system and a vertical backing portion. In some embodiments, first tine is similar to second tine, in that each are parallel to each other, of similar dimensions and configuration, and lie within the same horizontal plane. First and second tines are connected to body at their rear-most portion. The first and second tine further comprises a front wheel, a middle wheel, and a rear wheel.

In some embodiments, the front, middle and rear wheels are configured to provide substantial stability and ease of operation when transporting loaded pallets, especially when such transport occurs on a substantially uneven or non-smooth terrain, as in a gravel parking lot, or one in which the pavement has cracks and/or potholes. In some embodiments, the front, middle and rear wheels have an aspect ratio, defined as:

$$\text{Aspect Ratio} = \frac{\text{Height of Wheel}}{\text{Width of Wheel}}$$

Accordingly, in some embodiments of the present invention the front and rear wheels have a first aspect ratio and the middle wheel has a second aspect ratio greater than the first aspect ratio.

In some embodiments, the aspect ratios for each wheel are selected to provide the ability to negotiate substantially uneven or non-smooth terrain. Furthermore, because wheels are selected made of the appropriate material, which are not used on known pallet transportation assemblies, a pallet transportation assembly of the present invention will not scuff or scrape the floor of a convenience store or other retail establishment. For example, according to one embodiment of the present invention, one or more wheels of the present invention are made with a rubber compound. In other embodiments, one or more wheels of the present invention are made from semi-hard plastic.

Figure 4:
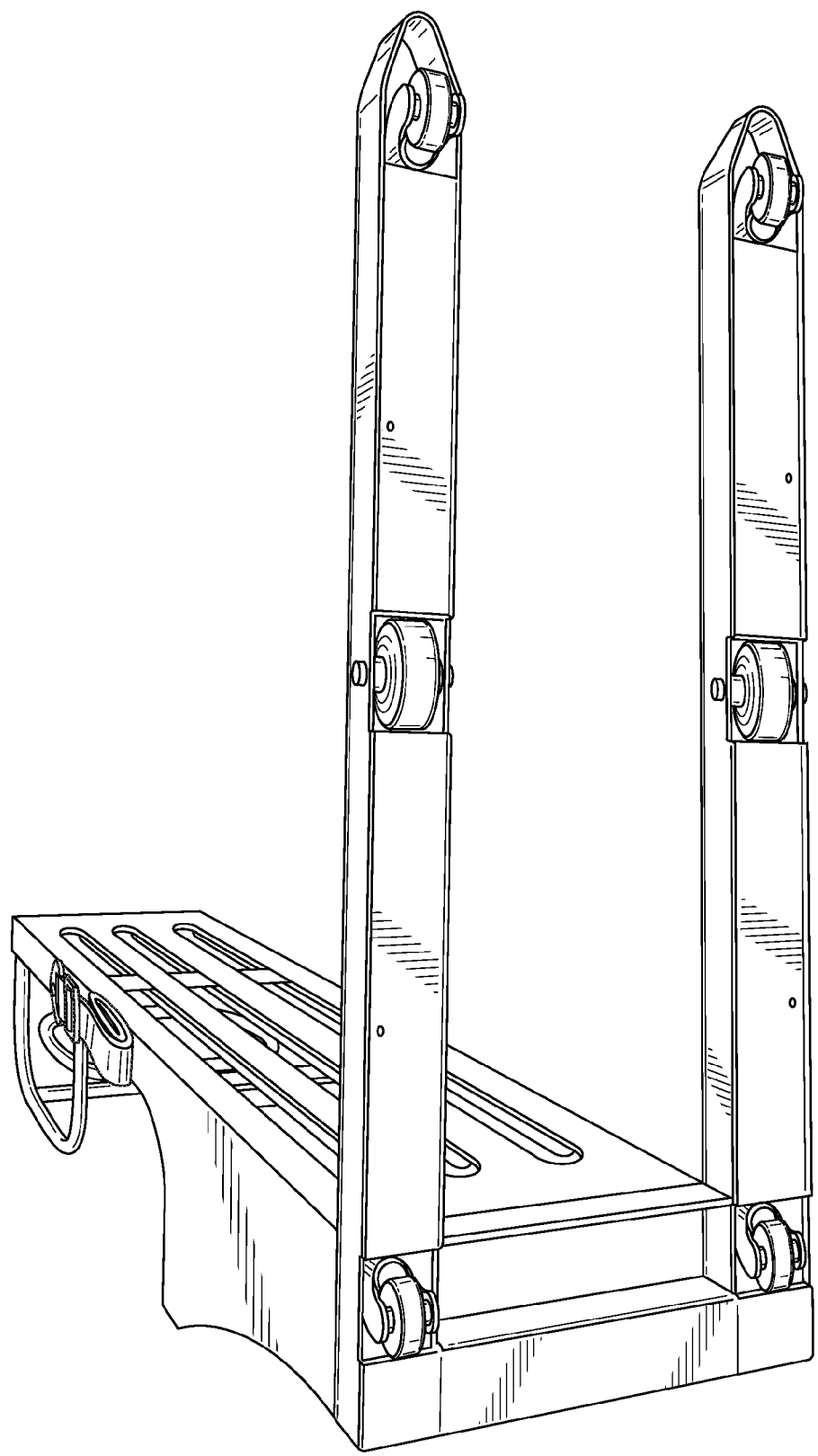
FIG. 4 a pallet transportation assembly in accordance with one embodiment of the present invention.
Figure 5:
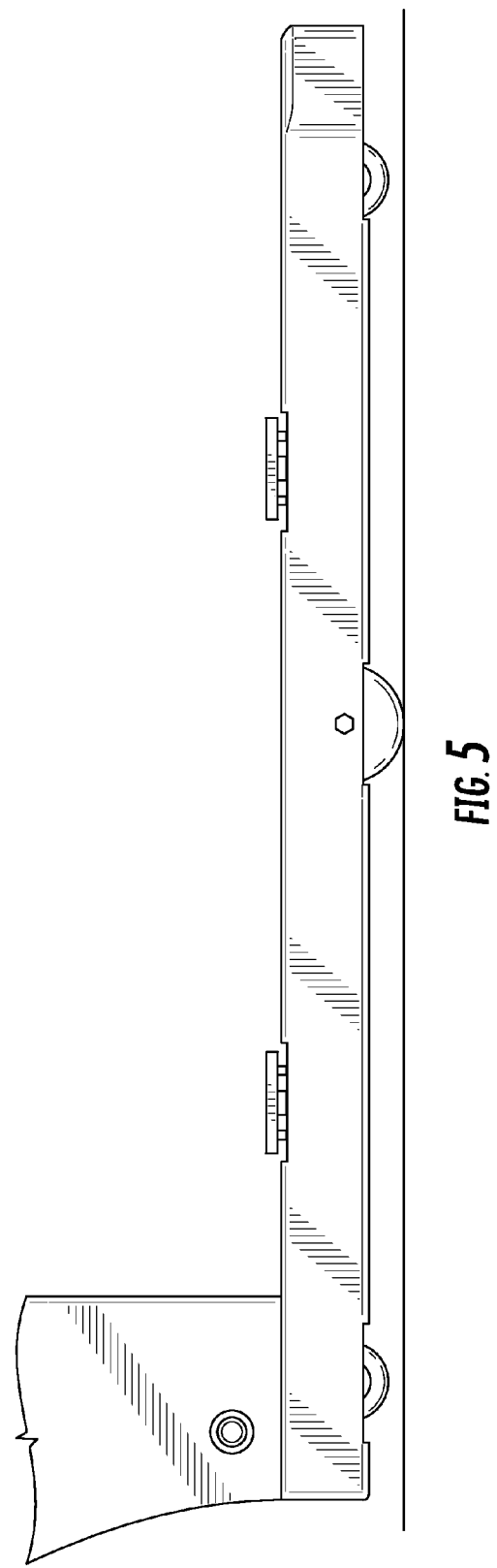
FIG. 5 a pallet transportation assembly in accordance with one embodiment of the present invention.
Figure 6:
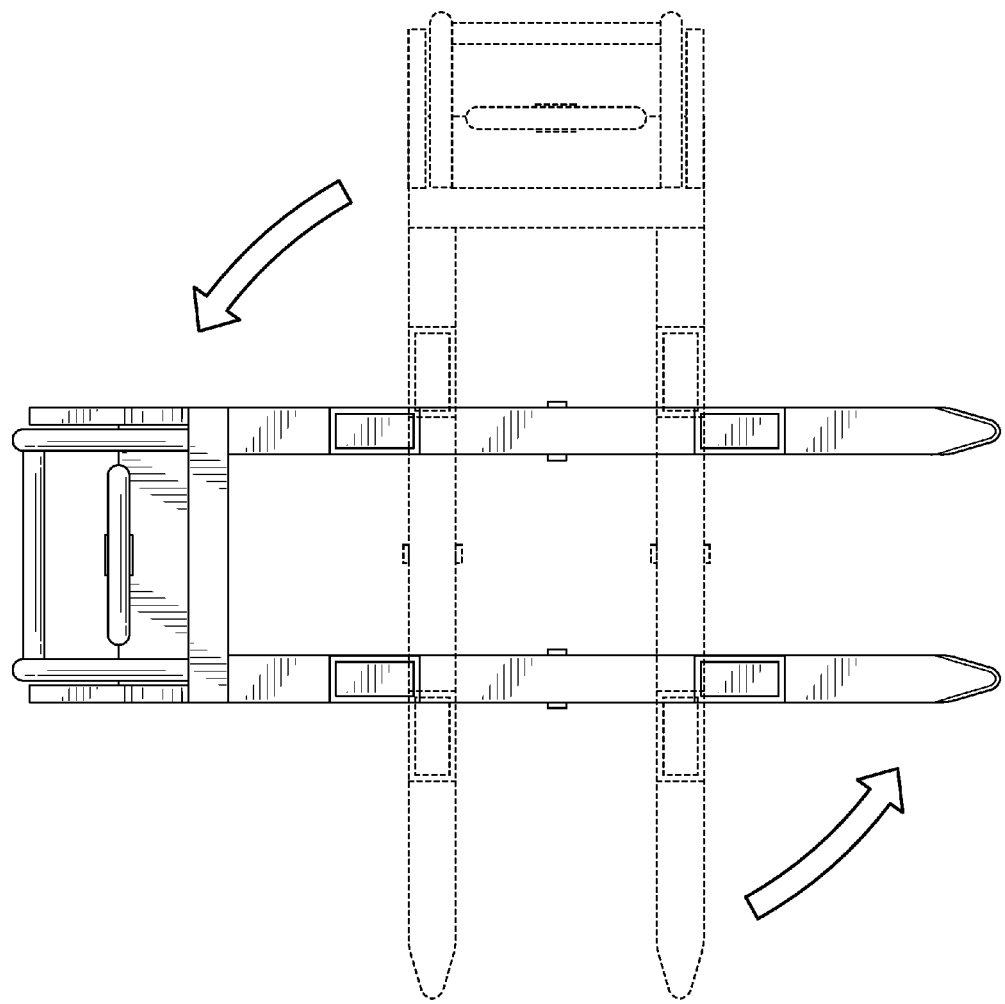
FIG. 6 shows a pallet transportation assembly in accordance with one embodiment of the present invention.

As shown in FIG. 4, in some embodiments, the front and rear wheels are caster swivel wheels, wherein the middle wheel rotates about a fixed axle. As depicted in the FIG. 5 and FIG. 6, the wheel configuration of the assemblies of the present invention high maneuverability, including the capability of pivoting in a 360 degree manner about the middle wheels. Increased maneuverability is advantageous over conventional assemblies because it allows the operator to negotiate a number of small spaces, ultimately increasing the efficiency of pallet transport.

According to the embodiment depicted in FIG. 1, each tine comprises one or more risers. In some embodiments, the riser is located in the plane of the tine and is coupled to the tine adjustment system. In some embodiment, the tine adjustment system is configured to move the riser in and out of the plane of the tine to engage a base configuration of a pallet. In some embodiments the riser may comprise one or more independent points of contact. For example, as depicted in FIG. 1, the embodiment shown has four risers, located in the plane of the tines. In other embodiments, the risers can be configured to be a singular piece along a length of the tine. The riser of the present invention may be operated simultaneously or independently from each other. In some embodiments the tine adjustment system is configured to simultaneously move each riser at the substantially the same speed and height. In some embodiments, the tine adjustment system is configured to move less than all of the risers located in the plane of the tines.

A riser of the present invention is comprised of a material that is the same as or different than the material from which the tine is made. For example, in some embodiments, a tine is made from a metal, e.g. steel, and riser is also made from steel. In other embodiments, tine 101 is made from a metal, e.g. steel, and riser is made from a material softer than steel, e.g. rubber. In some embodiments, the riser is made from a material that reduces damage to a pallet. Examples of materials from which the riser can be made include, but are not limited to steel, aluminum, iron, rubber, polymeric materials, or combinations thereof.

A riser of the present invention may comprise various shapes or configurations in order to accommodate various base configurations of the pallet to be transported. For example, a riser of the present invention may comprise notches, staggered heights, platforms, tongue and groove components, or combinations thereof. While not being bound by any particular theory, in some embodiments a riser having a configuration that complements a base configuration of the pallet being transported increases the surface area shared between the riser and the pallet, thus, increasing the stability of the pallet being transported.

While not being bound to one particular theory, the riser of the present invention allows the assembly to interface with the pallet without altering the assemblies contact with the ground. For example, in some embodiments, the pallet is lifted using the riser, wherein the assembly remains in constant, unchanged contact with the ground. This allows for increased stability and efficiency when transporting pallets.

In some embodiments, the body of the present invention further comprises a tine adjustment system. In some embodiments, a tine adjustment system is configured to manipulate a tine and/or a riser of the present invention. For example, a tine adjustment system of the present invention may be configured to perform a number of functions including, but not limited to, elevating the tines, lowering the tines, adjusting the pitch of the tines, adjusting the yaw of the tines, adjusting the plane of the tines, adjusting the length of the tines or combinations thereof. Tine adjustment systems are generally known to those of skill in the art and may include, but are not limited to, hydraulic systems, pneumatic systems, electrical systems, mechanical systems and the like, or combinations thereof. In some embodiments, the tine adjustment system is configured to independently manipulate each tine and/or riser.

In some embodiments, a body for use in the present invention may further include one or more wheels. In some embodiments, the body wheel assists the operator of the pallet transportation assembly to maneuver the orientation of the pallet transportation assembly in space. In some embodiments, wheel 107 free pivots in a 360° manner. In some embodiments, the wheel is connected to a motor to provide drive to the pallet transportation assembly in order to facilitate the transportation of pallets using a pallet transportation assembly of the present invention.

In some embodiments, the pallet transportation assembly further comprises a vertical backing portion. In some embodiments, vertical backing portion serves to provide vertical support to the goods carried on the pallet to reduce the occurrence of toppling. In some embodiments, vertical backing portion further comprises a lashing system. In some embodiments, lashing system provides increased cargo stability by securing the cargo to the pallet transportation assembly of the present invention. Examples of lashing systems suitable for use with the present invention include, but are not limited to, strap and buckles, cords, ratcheting systems, and the like, or combinations thereof. In some embodiments, the lashing system comprises a strap, buckle, and ratcheting mechanism.

In some embodiments, the vertical backing portion further comprises an adjustable wall. The adjustable wall provides additional cargo support for loads contained on pallets smaller than the length of the tines. In some embodiments, the adjustable wall can engage the cargo, wherein the adjustable wall moves from a compartment located on the body. In some embodiments, the adjustable wall moves both laterally down the length of the tines or vertically in the plane of the vertical backing portion. In some embodiments, the adjustable wall rotates about a fixed point located in the vertical backing portion. In some embodiments, the adjustable wall further comprises a lashing system as described above. In some embodiments, the adjustable wall comprises notches or cavities which may be used to assist in securing the cargo being transported. being transported on the pallet transportation assembly.

In some embodiments, the present invention is directed to a process for transporting a pallet having a base configuration, the process comprising the step of providing a pallet transportation assembly comprising a first and second tine, each having a top, a bottom, a front wheel, a middle wheel, a rear wheel and a riser; and a body coupled to the first and second tines comprising a tine adjustment system; a wheel, and a vertical backing portion; wherein the front wheel and rear wheel have a first aspect ratio and the middle wheel has a second aspect ratio greater than the first aspect ratio; wherein the front and rear wheels are caster swivel wheels and the middle wheel rotates about a fixed axle; adjusting each riser to accommodate the base configuration of the pallet; transporting the pallet; pivoting the pallet transportation assembly about the middle wheel; and adjusting the riser to disengage the assembly from the pallet.

While not being bound by any particular theory, the present invention dramatically reduces the materials and resources needed to transport pallets between locations by providing a pallet transportation assembly that is capable of transporting pallets having differing base configurations. Another advantage of the present invention is the ability to retrofit present pallet transportation assemblies with the features of the present invention to increase their utility. For example, the pallet transportation assemblies described in U.S. Patent Appl. Pub. Nos. 2009/0185890, 2009/0183953, 2008/0149005, 2010/0196134, 2010/0295261 and U.S. Pat. No. 8,011,677, which are incorporated by reference in their entirety herein, may be suitable candidates for retrofitting with the features of the presently claimed invention.

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments is are merely illustrative and should not be considered restrictive in any way. The scope of the invention is defined by the appended claims and their equivalents, rather than by the preceding description.

All United States patents and applications, foreign patents, and publications discussed above are hereby incorporated herein by reference in their entireties.

I claim:

1. A pallet transportation assembly comprising:
  a first and second tine, each tine having a top surface, a bottom surface, an inner surface, an outer surface, a front caster swivel wheel, a middle fixed axle wheel, and a rear caster swivel wheel, and a plurality of adjustable risers comprising a front adjustable riser embedded in the tine between the inner and outer surface of the tine and between the front caster swivel wheel and middle fixed axle wheel and a rear adjustable riser embedded in the tine between the inner and outer surface of the tine and between the rear caster swivel wheel and the middle fixed axle wheel;

the plurality of adjustable risers each having a top surface and configured to move in synchrony from a first position wherein each top surface of the adjustable risers is below or coplanar to the top surface of the tine to a second position wherein each top surface of the adjustable risers is above and parallel to the top surface of the tine; and a body coupled to the first and second tines comprising a vertical backing portion.

2. The assembly of claim 1, wherein the plurality of adjustable risers are configured to move from the first position to the second position mechanically, pneumatically, electrically, hydraulically or by combinations thereof.

3. The assembly of claim 1, wherein the top surface of the plurality of adjustable risers is configured to receive a base configuration of a pallet.

4. The assembly of claim 1, wherein the vertical backing portion comprises a lashing system.

5. The assembly of claim 4, wherein the lashing system comprises a strap, buckle and ratcheting mechanism.

6. The assembly of claim 1, wherein the first and second tines are co-planar and parallel to each other.

7. The assembly of claim 1, the front wheel and the rear wheel on each tine have an aspect ratio less than an aspect ratio of the middle wheel on that tine.

8. A process for transporting a pallet having a base configuration, the process comprising the steps of:
(a) providing a pallet transportation assembly comprising a first and second tine, each tine having a top surface, a bottom surface, an inner surface, an outer surface, a front caster swivel wheel, a middle fixed axle wheel, and a rear caster swivel wheel, and a plurality of adjustable risers comprising a front adjustable riser embedded in the tine between the inner and outer surface of the tine and between the front caster swivel wheel and middle fixed axle wheel and a rear adjustable riser embedded in the tine between the inner and outer surface of the tine and between the rear caster swivel wheel and the middle fixed axle wheel;

the plurality of adjustable risers each having a top surface and configured to move in synchrony from a first position wherein each top surface of the adjustable risers is below or coplanar to the top surface of the tine to a second position wherein each top surface of the adjustable risers is above and parallel to the top surface of the tine; and a body coupled to the first and second tines comprising a vertical backing portion;

wherein the front wheel and rear wheel have an aspect ratio less than an aspect ratio of the middle wheel;

(b) raising the plurality of adjustable risers to engage the base configuration of the pallet thereby lifting the pallet;

(c) transporting the lifted pallet using the pallet transportation assembly;

(d) pivoting the pallet transportation assembly about the middle wheel; and (e) lowering the plurality of adjustable risers to lower the pallet and disengage the pallet transportation assembly from the base configuration of the pallet.

9. The method of claim 8, wherein the plurality of adjustable risers are configured to move from the first position to the second position mechanically, pneumatically, electrically, hydraulically or by combinations thereof.

10. The method of claim 8, wherein the assembly of claim 1, wherein the vertical backing portion comprises a lashing system and the method further comprises securing a load located on the pallet to the vertical backing portion.

11. The method of claim 9, wherein the lashing system comprises a strap, buckle and ratcheting mechanism.

12. The method of claim 8, wherein the first and second tines are co-planar and parallel to each other.

13. The method of claim 8, wherein an aspect ratio of the front caster swivel wheel and rear caster swivel wheel are substantially the same and less than an aspect ratio of the middle fixed axle wheel.

\* \* \* \* \*